United States Patent
Yuuki

(10) Patent No.: US 8,223,015 B2
(45) Date of Patent: Jul. 17, 2012

(54) ELECTRONIC APPARATUS SYSTEM HAVING A PLURALITY OF RACK-MOUNTED ELECTRONIC APPARATUSES, AND METHOD FOR IDENTIFYING ELECTRONIC APPARATUS IN ELECTRONIC APPARATUS SYSTEM

(75) Inventor: Kazuhiro Yuuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 12/413,558

(22) Filed: Mar. 28, 2009

(65) Prior Publication Data

US 2009/0243846 A1 Oct. 1, 2009

(30) Foreign Application Priority Data

Mar. 28, 2008 (JP) ................................. 2008-085365

(51) Int. Cl.
*G08B 21/00* (2006.01)
(52) U.S. Cl. .............. 340/540; 340/815.45; 340/286.02; 714/47.1; 718/100
(58) Field of Classification Search .................. 340/540, 340/815.45, 286.02; 714/47, 7, 31, 43, 57, 714/3; 718/100; 713/1; 710/301–304
See application file for complete search history.

(56) References Cited

U.S. PATENT DOCUMENTS

| | | | |
|---|---|---|---|
| 4,086,565 A * | 4/1978 | Schorter | 340/475 |
| 5,018,143 A | 5/1991 | Platteter et al. | |
| 6,862,695 B2 | 3/2005 | Lin | |
| 6,907,500 B2 | 6/2005 | Suzuki et al. | |
| 6,919,816 B2 * | 7/2005 | Dearborn et al. | 340/815.45 |
| 7,002,459 B1 * | 2/2006 | Escandon | 340/467 |
| 7,436,303 B2 * | 10/2008 | Tourrilhes et al. | 340/572.1 |
| 7,738,242 B2 * | 6/2010 | McGraw et al. | 361/679.21 |
| 2002/0095487 A1 * | 7/2002 | Day et al. | 709/223 |
| 2002/0113714 A1 * | 8/2002 | Lopez | 340/815.45 |
| 2002/0121913 A1 * | 9/2002 | Miller et al. | 324/760 |
| 2003/0191825 A1 | 10/2003 | Miyazaki et al. | |
| 2004/0049633 A1 | 3/2004 | Suzuki et al. | |
| 2004/0100933 A1 | 5/2004 | Iwabuchi | |
| 2005/0195075 A1 * | 9/2005 | McGraw et al. | 340/500 |
| 2005/0256942 A1 * | 11/2005 | McCardle et al. | 709/220 |
| 2006/0121421 A1 * | 6/2006 | Spitaels et al. | 434/118 |
| 2006/0190768 A1 * | 8/2006 | Kawase | 714/31 |

(Continued)

FOREIGN PATENT DOCUMENTS

JP 58-33757 A 2/1983

(Continued)

OTHER PUBLICATIONS

"Extended European Search Report", mailed by EPO and corresponding to European application No. 09153457.8 on Sep. 14, 2010.

(Continued)

*Primary Examiner* — Hoi Lau
(74) *Attorney, Agent, or Firm* — Fujitsu Patent Center

(57) ABSTRACT

An electronic apparatus system includes a plurality of racks mounting a plurality of electronic apparatus. The system identifies the physical location of the electronic apparatus having sent the abnormality notification by using light emitting devices displaying the statuses of the electronic apparatuses. The light emitting devices of the entire electronic apparatuses on a rack is displayed, and the rack location is identified from among a plurality of racks.

14 Claims, 12 Drawing Sheets

U.S. PATENT DOCUMENTS

| | | | |
|---|---|---|---|
| 2006/0283944 A1* | 12/2006 | Holley | 235/385 |
| 2007/0010912 A1* | 1/2007 | Feingold et al. | 700/245 |
| 2007/0222597 A1* | 9/2007 | Tourrilhes et al. | 340/572.1 |
| 2008/0214140 A1* | 9/2008 | Caveney et al. | 455/402 |
| 2008/0288873 A1* | 11/2008 | McCardle et al. | 715/735 |
| 2009/0138110 A1* | 5/2009 | Kohyama et al. | 700/94 |
| 2009/0138313 A1* | 5/2009 | Morgan et al. | 705/8 |
| 2009/0234512 A1* | 9/2009 | Ewing et al. | 700/295 |
| 2009/0243846 A1* | 10/2009 | Yuuki | 340/540 |
| 2009/0309570 A1* | 12/2009 | Lehmann et al. | 323/318 |
| 2010/0017030 A1* | 1/2010 | Feingold et al. | 700/245 |
| 2010/0142544 A1* | 6/2010 | Chapel et al. | 370/401 |

FOREIGN PATENT DOCUMENTS

| | | | |
|---|---|---|---|
| JP | 58-033757 A | 2/1983 | |
| JP | 05-188870 A | 7/1993 | |
| JP | 07-219812 | 8/1995 | |
| JP | 2003-296205 | 10/2003 | |
| JP | 2004-103053 A | 4/2004 | |
| JP | 2004-179774 | 6/2004 | |
| JP | 2005-242916 | 9/2005 | |
| JP | 2007-041763 | 2/2007 | |

OTHER PUBLICATIONS

Japanese Office Action mailed Apr. 24, 2012 for corresponding Japanese Application No. 2008-085365, with English-language translation.

* cited by examiner

| UNIT NO. | RACK NO. | SHELF-LEVEL NO. | IP ADDRESS |
|---|---|---|---|
| 1 | 1 | 1 | 192.168.11.1 |
| 2 | 1 | 2 | 192.168.11.2 |
| 3 | 1 | 3 | 192.168.11.3 |
| 4 | 1 | 4 | 192.168.11.4 |
| 5 | 1 | 5 | 192.168.11.5 |
| 6 | 1 | 6 | 192.168.11.6 |
| 7 | 1 | 7 | 192.168.11.7 |
| 8 | 1 | 8 | 192.168.11.8 |
| 9 | 2 | 1 | 192.168.12.1 |
| · |  |  | 192.168.12.2 |
| 16 | 2 | 8 | 192.168.12.8 |
| · |  |  |  |
| · |  |  |  |
| 32 | 4 | 8 | 192.168.14.8 |
| · |  |  |  |
| · |  |  |  |
|  |  |  |  |
| 127 | 16 | 7 | 192.168.26.7 |
| 128 | 16 | 8 | 192.168.26.8 |

BROADCAST COMMAND

XSCF> setlocator blink 192. 168. 11. <u>255</u>

ELECTRONIC APPARATUS SYSTEM HAVING A PLURALITY OF RACK-MOUNTED ELECTRONIC APPARATUSES, AND METHOD FOR IDENTIFYING ELECTRONIC APPARATUS IN ELECTRONIC APPARATUS SYSTEM

CROSS-REFERENCE TO RELATED APPLICATIONS

This application is based upon and claims the benefit of priority of the prior Japanese Patent Application No. 2008-85365, filed on Mar. 28, 2008, the entire contents of which are incorporated herein by reference.

FIELD

The present invention relates to an electronic apparatus system and a method for identifying an installation location of an electronic apparatus on a rack.

BACKGROUND

A data processing system tends to be larger in scale to meet the requirement for improving system processing capacity of the data processing system. For example, a parallel computer system is configured of server units on the order of thousand sets connected in parallel. Similarly, in a large-scale storage system, the system is configured of several hundreds of magnetic disk units (hard disk units). The tendency is also the same in a communication apparatus.

To install such the electronic apparatuses in an integrated manner, a method of mounting a multiplicity of electronic apparatuses in a rack is widely used. On the occurrence of a fault or the like in such the electronic apparatuses, it is necessary that an operator identifies the faulty electronic apparatus from among the multiplicity of electronic apparatuses and restores from the fault or the like, or replaces it.

FIG. 15 is an explanation diagram of the conventional method for identifying the physical location of the rack-mounted electronic apparatus. Here, as an electronic apparatus, the description of a server unit is given as an example. A multiplicity of server units 90 are mounted on a multiplicity of racks 1-n. Here, six (6) sets of the server units 90 are mounted on a single rack, and there are arranged such racks in the number of n (100, for example).

Each server unit 90 is connected to a control server unit 92 to control the entire server units 90, through a control LAN (Local Area Network) 94. The control server unit 92 includes a server location information table 96 which stores an IP (Internet Protocol) address, a host name, a rack number, and a shelf-level number of the rack for each server unit. The table 96 is generated in advance by the input from a system administrator.

When the control server unit 90 is notified an abnormality notification from the server unit 90 through the control LAN 94, the control server unit 90 displays the rack number of the server unit 90 and the shelf-level number of the rack by referring to the table 96 according to the notified IP address. As such, the physical location of the server unit 90 having sent the abnormality notification has conventionally been identified.

However, by the aforementioned method only, it is difficult to identify the server unit at the actual physical (mounting) server unit location.

Therefore, there has been carried out a management method by sticking on each server unit a seal having an individual unit number. Alternatively, there has also been proposed a method of provision of a display panel on the rack and changing the display status of a display lamp on the display panel (for example, refer to Patent document 1).

Further, although it is not the case of server units, with regard to printer units, there has been proposed a method of notifying an abnormality of a unit in the event of the abnormality, by changing the display mode of a light emission device displaying the status of the self-unit (for example, refer to Patent document 2).

[Patent document 1] the official gazette of the Japanese Unexamined Patent Publication No. 2004-103053.

[Patent document 2] the official gazette of the Japanese Unexamined Patent Publication No. Hei-5-188870.

SUMMARY

According to the conventional management method by sticking seals each having unit number on the individual servers, it has been necessary to stick the unit number seals of the units. In case of a large-scale system configuration having almost thousand sets, a large amount of labor has been required to prepare the seals and stick the seals corresponding to electronic apparatuses accurately.

According to the method of providing the display lamps on the rack, special facilities are necessary to turn on the lamps, which has necessitate the user to bear additional costs.

Further, according to the method of using display lamps unit-by-unit, there has been the problem that the display mode cannot be changed when the electronic apparatus is faulty or the display lamp itself is faulty.

Furthermore, according to such the electronic control methods, it has been necessary to input physical location information of the server unit group in advance to the control server unit, causing a large amount of labor in case of a large scale system.

Accordingly, it is an object of the present invention to provide an electronic apparatus system, and a method for performing identification processing of the physical location of an electronic apparatus, for identifying the physical location of the electronic apparatus having sent an abnormality notification among the electronic apparatuses mounted on the multiplicity of racks, using status display devices of the electronic apparatuses.

It is another object of the present invention to provide an electronic apparatus system, and a method for performing identification processing of the physical location of an electronic apparatus, for identifying the physical location of the electronic apparatus having sent an abnormality notification, using status display devices of the electronic apparatuses, even when a display status by the status display device of the electronic apparatus cannot be changed.

It is still another object of the present invention to provide an electronic apparatus system, and a method for performing identification processing of the physical location of an electronic apparatus, for identifying the physical location of the electronic apparatus having sent an abnormality notification, without need of adding special hardware.

Further, it is still another object of the present invention to provide an electronic apparatus, and a method for performing identification processing of the physical location of an electronic apparatus, for identifying the physical location of the electronic apparatus having sent an abnormality notification, without need of inputting physical location information of a server unit group in advance.

To achieve the above-described objects, an electronic apparatus system includes: a plurality of racks mounting a plurality of electronic apparatuses; a light emitting device provided on each the electronic apparatus; a network connecting each the electronic apparatus; and a control electronic apparatus receiving an abnormality notification of the electronic apparatus through the network, controlling the light emitting devices of the electronic apparatuses on the rack mounting the electronic apparatus having sent the abnormality notification to be in an identical display mode, and thereafter controlling one display mode of the light emitting device of the electronic apparatus having sent the abnormality notification to be different from other display modes of the light emitting devices of the other electronic apparatuses.

A processing method for identifying a physical location of an electronic apparatus, includes the steps of: receiving an abnormality notification of the electronic apparatus through a network connecting a plurality of electronic apparatuses mounted on a plurality of racks; controlling light emitting devices of the entire electronic apparatuses on the rack mounting the electronic apparatus having sent the abnormality notification to be in an identical display mode; and controlling one display mode of the light emitting device of the electronic apparatus having sent the abnormality notification to be different from other display modes of light emitting devices of the other electronic apparatuses.

Additionally, it is preferable to provide an electronic apparatus system according to the present invention, wherein, the control electronic apparatus controls to turn on the light emitting devices of the other electronic apparatuses according to the light emitting device of the electronic apparatus having sent the abnormality notification being faulty.

It is further preferable to provide an electronic apparatus system according to the present invention, wherein the control electronic apparatus communicates with each the electronic apparatus through the network to confirm normality or abnormality, and the other electronic apparatus performs display control of the light emitting devices of the electronic apparatuses in behalf of the control electronic apparatus when the control electronic apparatus is abnormal.

Further, it is preferable to provide an electronic apparatus system according to the present invention, wherein, the control electronic apparatus controls the light emitting devices of the electronic apparatuses on the rack mounting the electronic apparatus having sent the abnormality notification to be in an identical display mode by issuing a broadcast command using an IP address including the rack number.

Furthermore, it is preferable to provide an electronic apparatus system according to the present invention, wherein the light emitting devices are disposed on a front face and a back face of the electronic apparatus.

Additionally, it is preferable to provide an electronic apparatus system according to the present invention, wherein the identical display mode of the light emitting devices of the electronic apparatuses on the rack mounting the electronic apparatus having sent the abnormality notification is blinks of the light emitting devices.

Further, it is preferable to provide an electronic apparatus system according to the present invention, wherein, the electronic apparatus changes rhythm of the blinks of the light emitting devices according to an operation condition of the electronic apparatus.

It is further preferable to provide an electronic apparatus system according to the present invention wherein the electronic apparatus is constituted of a server unit.

As such, using light emitting devices displaying the statuses of the electronic apparatuses, the light emitting devices of the entire electronic apparatuses on a rack are displayed, and the rack location is identified from among a plurality of racks. Then, because the light emitting device of the electronic apparatus having sent an abnormality notification are changed from the light emitting device display mode of another electronic apparatus, it is easy to identify the physical location of the electronic apparatus having sent the abnormality notification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described hereinafter in the order of an electronic apparatus system, LED display processing, processing for identifying a physical location of an abnormal electronic apparatus, substitutive processing for the physical location identification processing, and other embodiments.

[Electronic Apparatus System]

Figure 1:
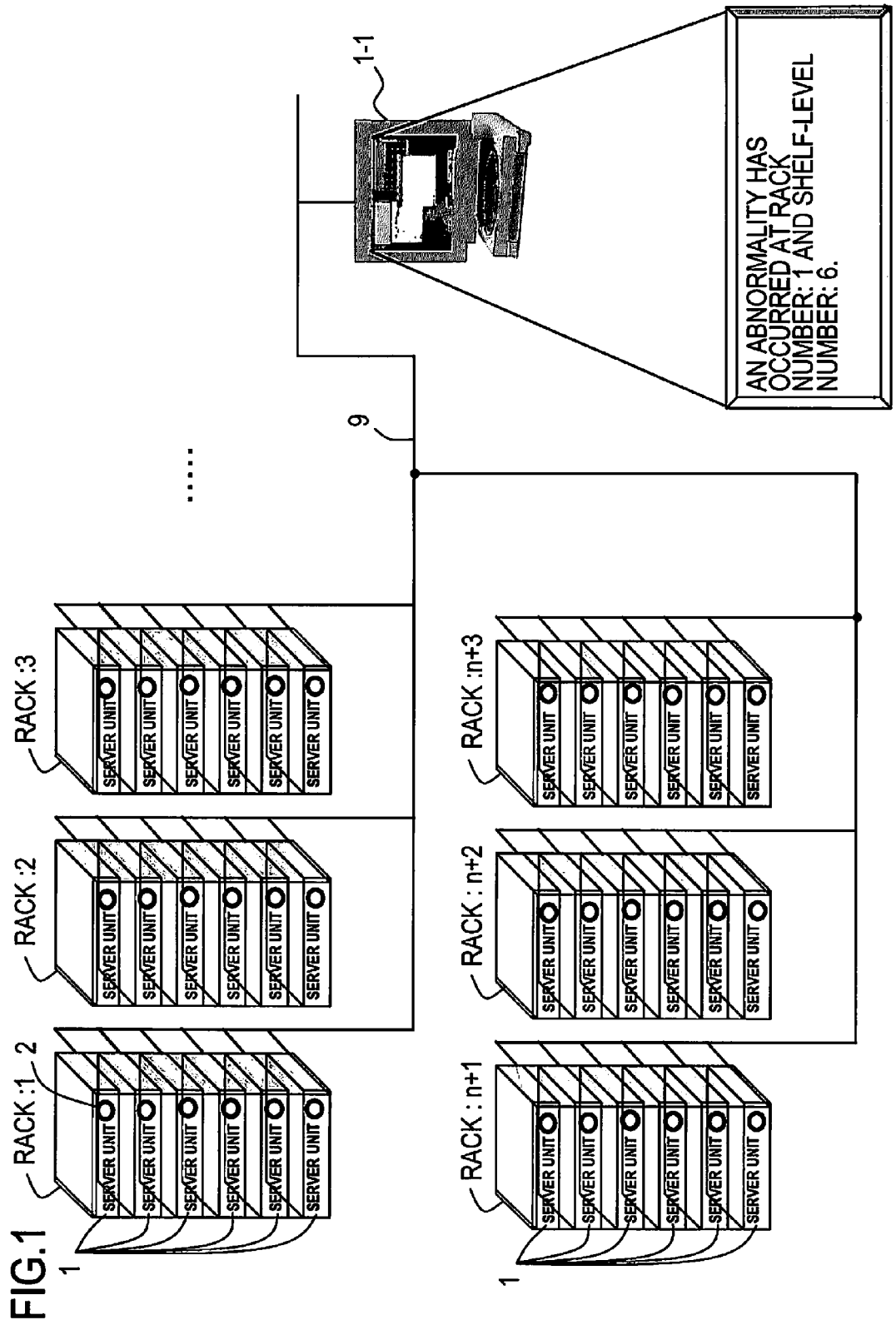
FIG. 1 is a configuration diagram of the electronic apparatus system according to one embodiment of the present invention.
Figure 2:
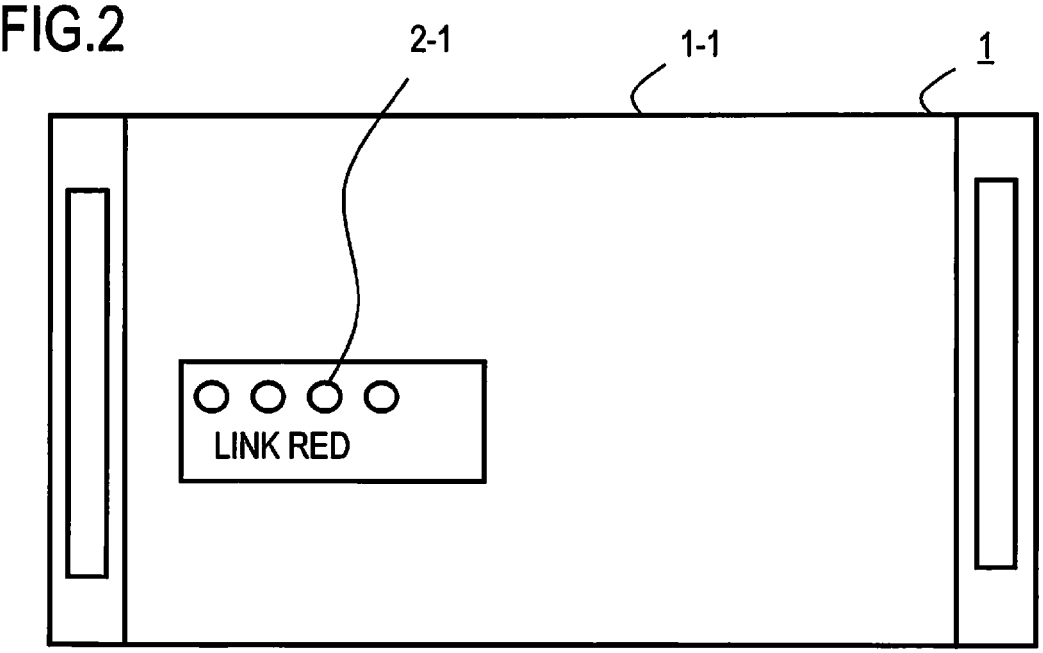
FIG. 2 is a front view of a server unit shown in FIG. 1.
Figure 3:
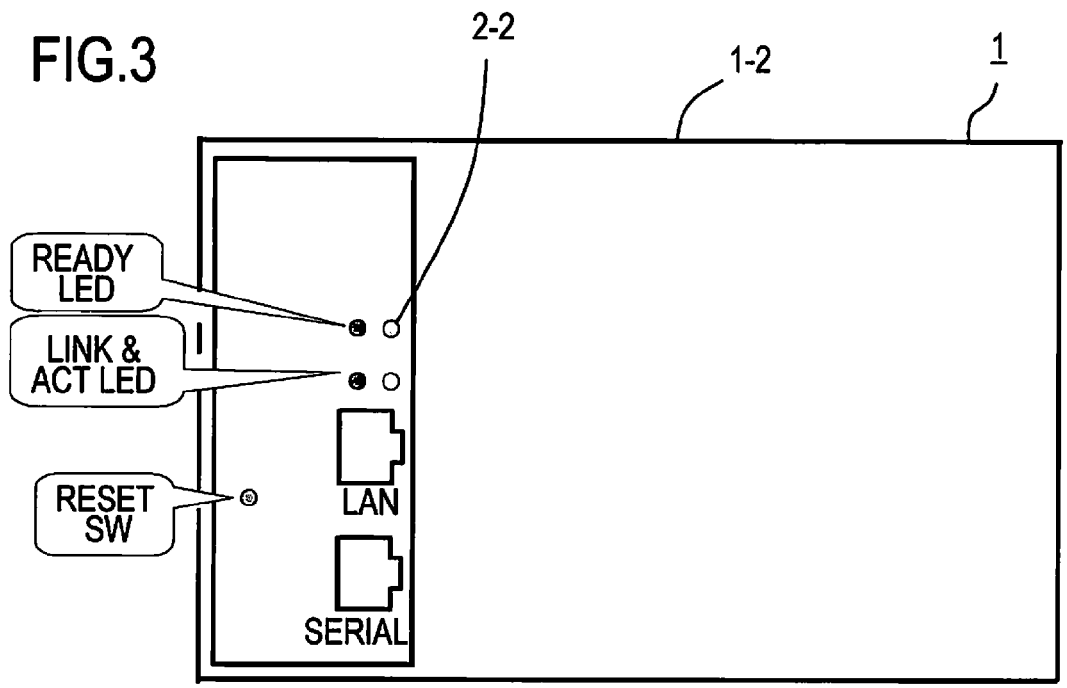
FIG. 3 is a rear view of the server unit shown in FIG. 1.
Figure 4:
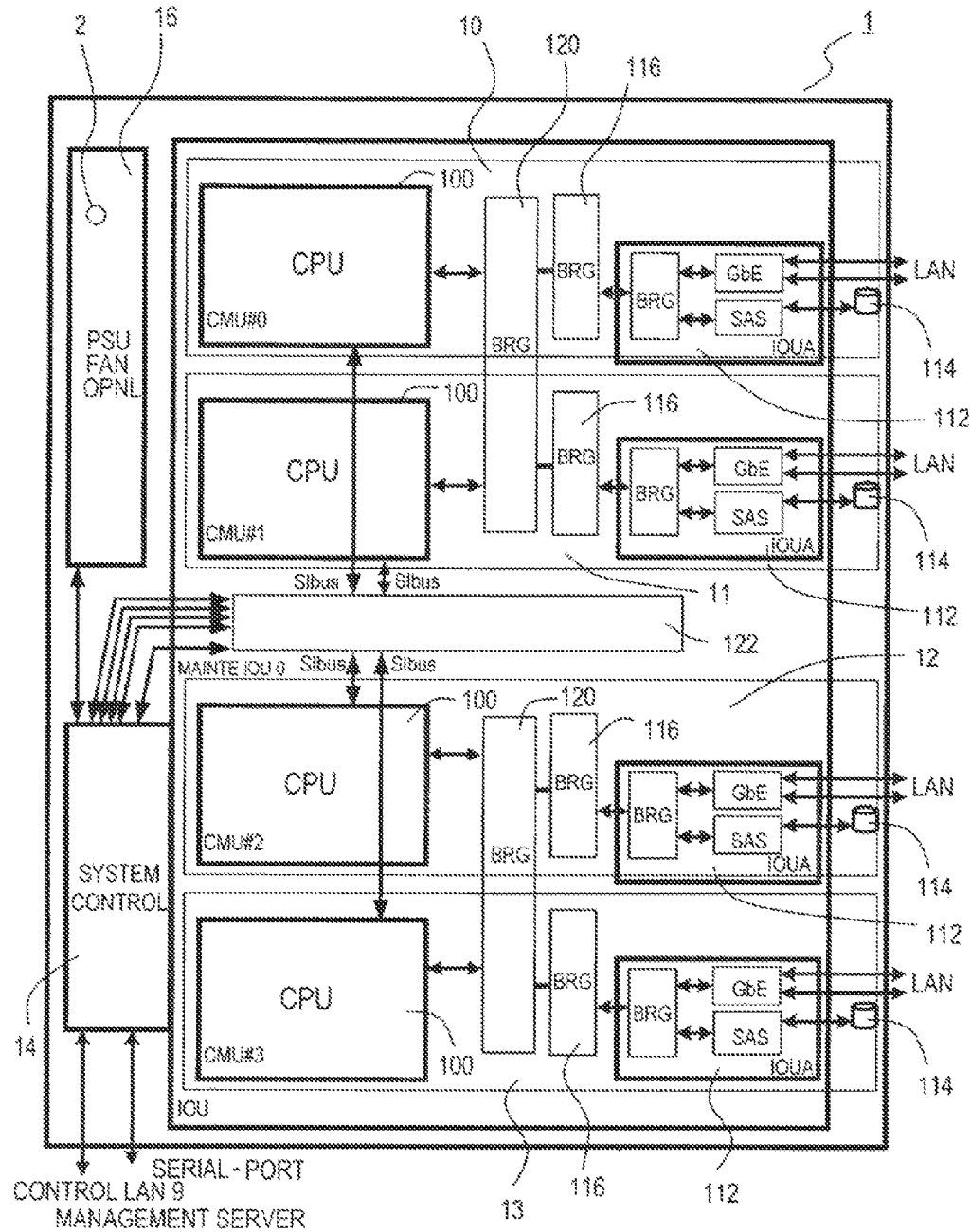
FIG. 4 is a configuration diagram of the server unit according to FIG. 2.
Figure 5:
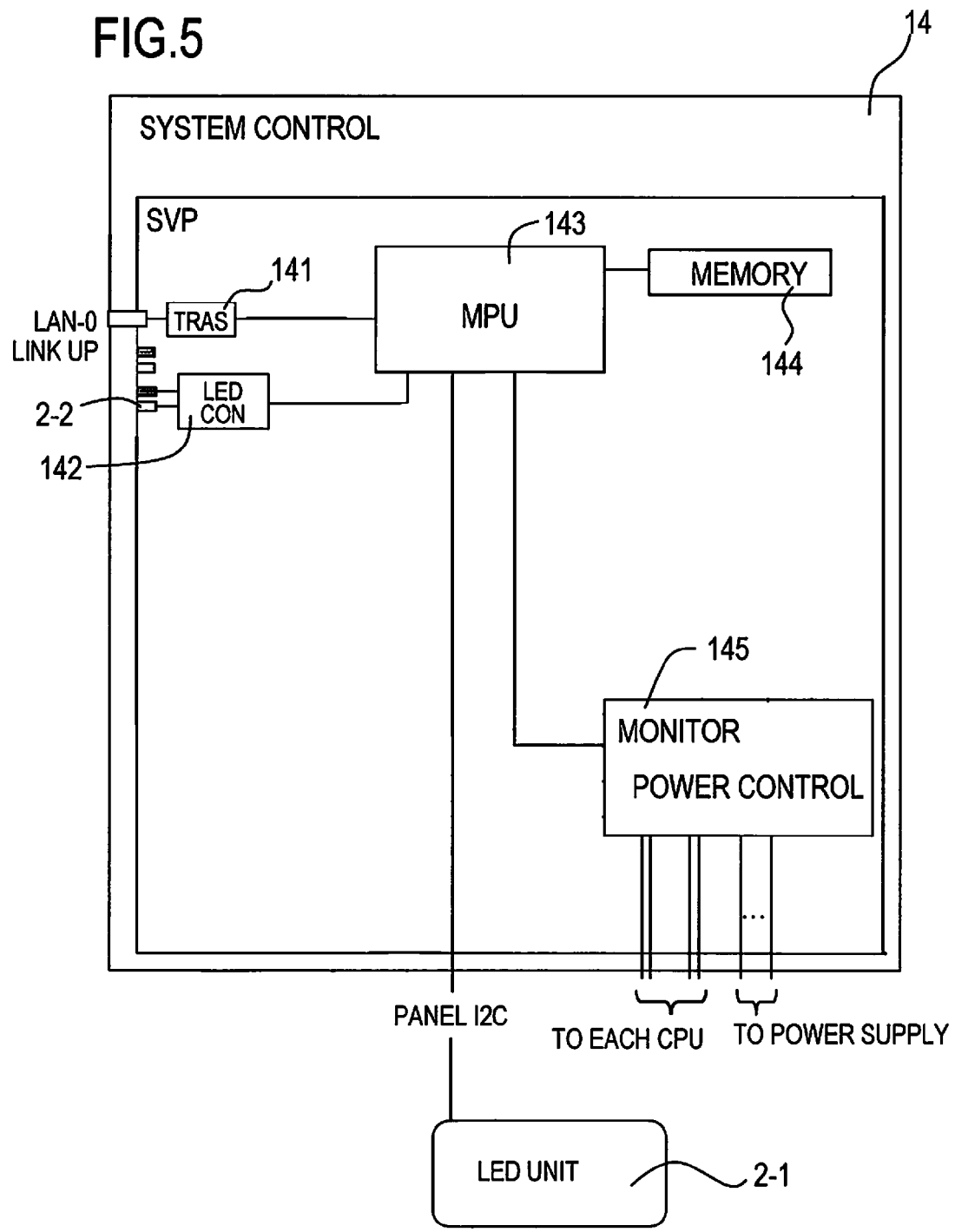
FIG. 5 is a configuration diagram of a system control section shown in FIG. 4.

FIG. 1 is a configuration diagram of the electronic apparatus system according to one embodiment of the present invention; FIG. 2 is a front view of a server unit shown in FIG. 1; FIG. 3 is a rear view of the server unit shown in FIG. 1; FIG. 4 is a configuration diagram of the server unit according to FIG. 1; and FIG. 5 is a configuration diagram of a system control section shown in FIG. 4. In FIG. 1, the server unit is indicated as an example of the electronic apparatus.

As indicated in FIG. 1, a plurality of server units 1 are mounted on a plurality of racks 1-(n+3). Here, six (6) server units 1 are mounted on single rack, and such racks are arranged in a plurality of rows by the number of n+3 (150 as an example).

A connection between each server unit 1 and a control server unit 1-1 for controlling the entire server units 1 is made by use of a control LAN (Local Area Network) 9.

On each server unit 1, two light emitting devices (LEDs) 2, namely one LED in front and the other LED in back, are mounted to display abnormality of the unit. As indicated in FIG. 2, on the front face of the server unit 2, a status check lamp 2-1 is provided in addition to a ready lamp RED, and a link lamp LINK. Similarly, as indicated in FIG. 3, on the back face of the server unit 2, a status check lamp 2-2 is provided in addition to a ready lamp RED, and a link lamp LINK.

When a plurality of racks having a plurality of server units mounted thereon are installed, it is difficult for an operator to move back and forth relative to the server units. Mounting check lamps 2-1, 2-2 respectively in front and in back of the server unit 1 is effective that changed displays of check lamps 2-1, 2-2 can be seen from both the front face side and the back face side of the server unit 1.

The control server unit 1-1 has functions of blinking and turning on and off the check lamps 2 (2-1, 2-2) on each server unit 1, via the LAN.

As indicated in FIG. 4, each server unit 1, 1-1 includes four (4) CPU blocks 10-13, a system control section 14 for performing system control of the CPU blocks 10-13, and a unit block 16 having an operator panel (OPNL) including the aforementioned check lamps 2, a fan (FAN) and a power supply (PSU).

The system control block 14 is connected to the control server 1-1 via the control LAN 9, and communicates with each CPU block 10-13 (CPU 100) via a system management circuit 122.

Each CPU block 10-13 includes a CPU (Central Processing Unit) 100, a magnetic disk unit 114, an interference circuit 112 interfacing with both the magnetic disk unit 114 and the LAN to interconnect the servers, and a first bridge circuit 116 for connecting between the interference circuit 112 and the CPU 100. Further, a second bridge circuit 120 is provided for using two neighboring interference circuits 112 between the neighboring CPUs 100.

As indicated in FIG. 5, the system control section 14 includes a transceiver/receiver 141 for the connection of the control LAN 9; an LED controller 142 for control to turn on and blink of the aforementioned check lamp 2-2 provided on the back face of the unit; an MPU (Microprocessor Unit) 143; a memory 144; a monitor/power supply control circuit 145 for performing the status monitoring and the status control of power supplies, fans and the CPU blocks 10-13; LED (check lamp) 2-1 disposed on the unit surface; and an LED control circuit (not shown) for controlling the LED.

Figure 10:
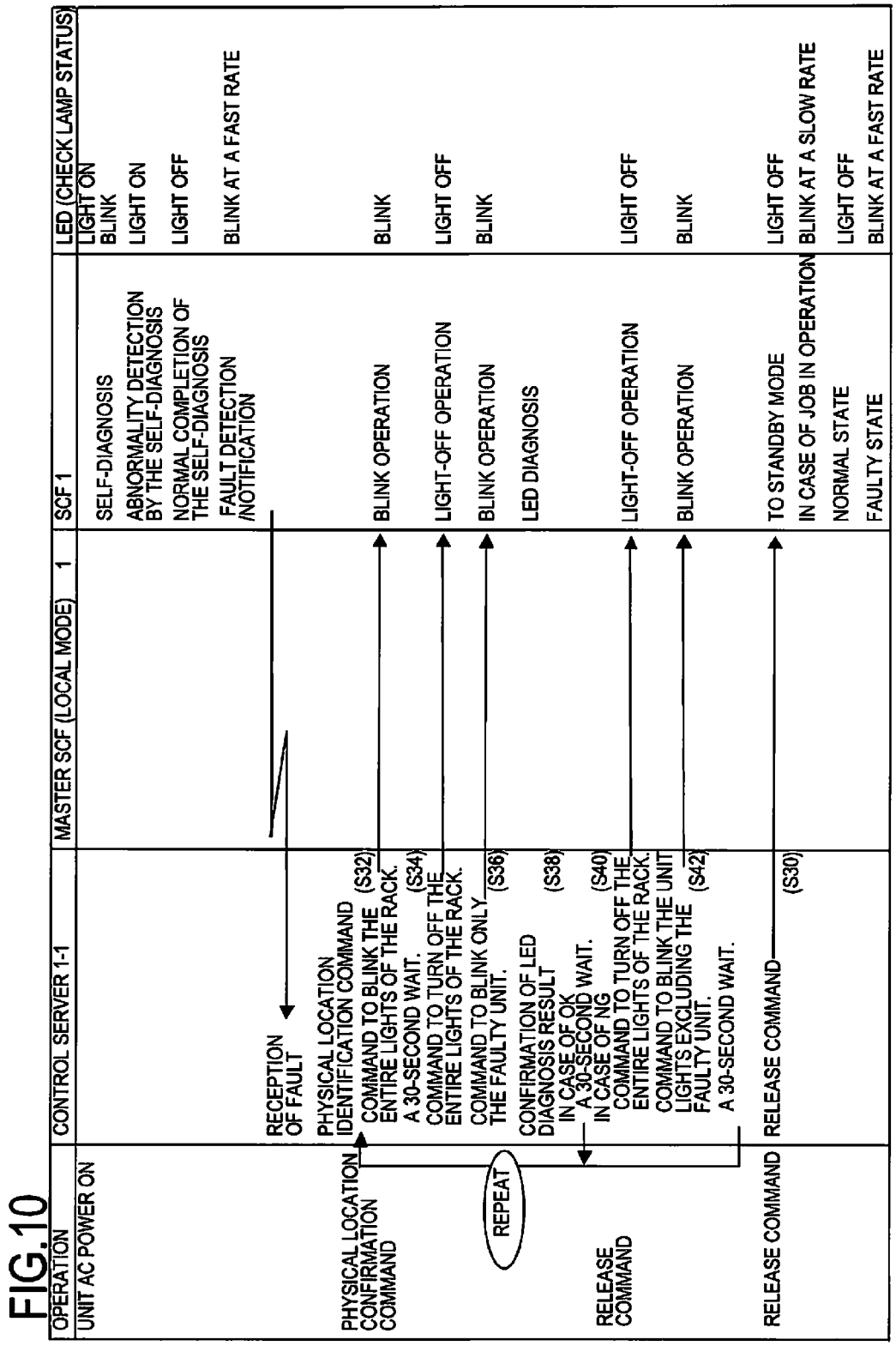
FIG. 10 is an explanation diagram of a processing sequence shown in FIG. 9.

The memory 144 stores a unit configuration table 144-1, which will be described in FIG. 10, and a flag indicating "master" or "local". The MPU 143 performs turn-on control (LED display processing) of the check lamps 2-1, 2-2 initiated by commands being input through control LAN 9, also substitutes the role of the control server unit according to a Master command. In addition, the control server unit 1-1 also has the configuration shown in FIGS. 4 and 5.

[LED Display Processing]

Figure 6:
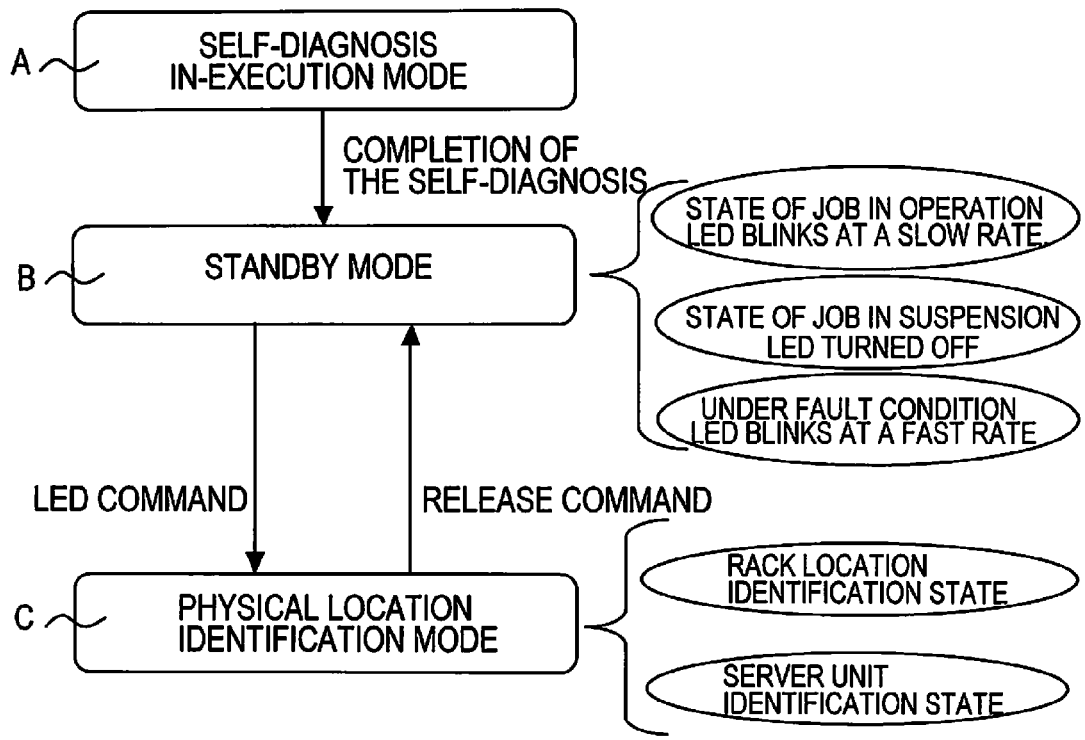
FIG. 6 is an explanation diagram of processing modes according to one embodiment of the present invention.
Figure 7:
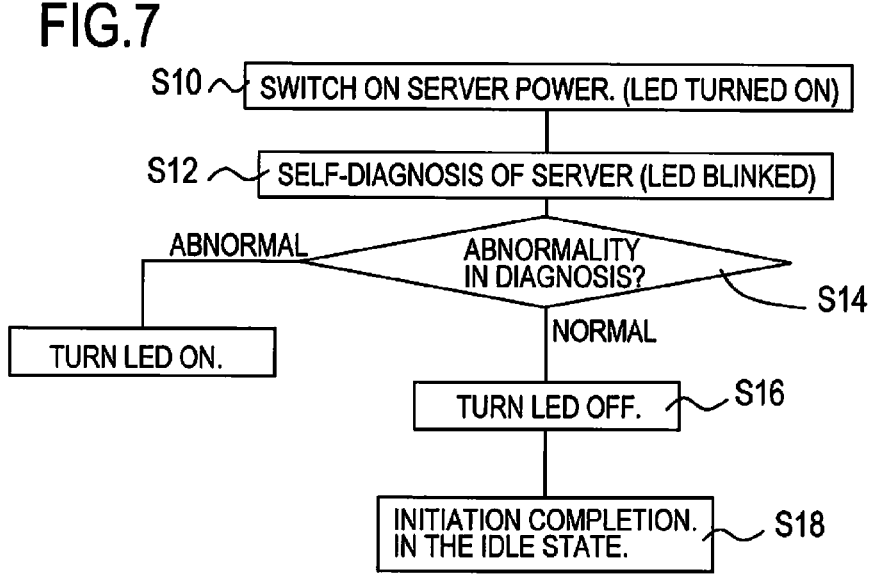
FIG. 7 is a processing flowchart of a self-diagnosis mode shown in FIG. 6.
Figure 8:
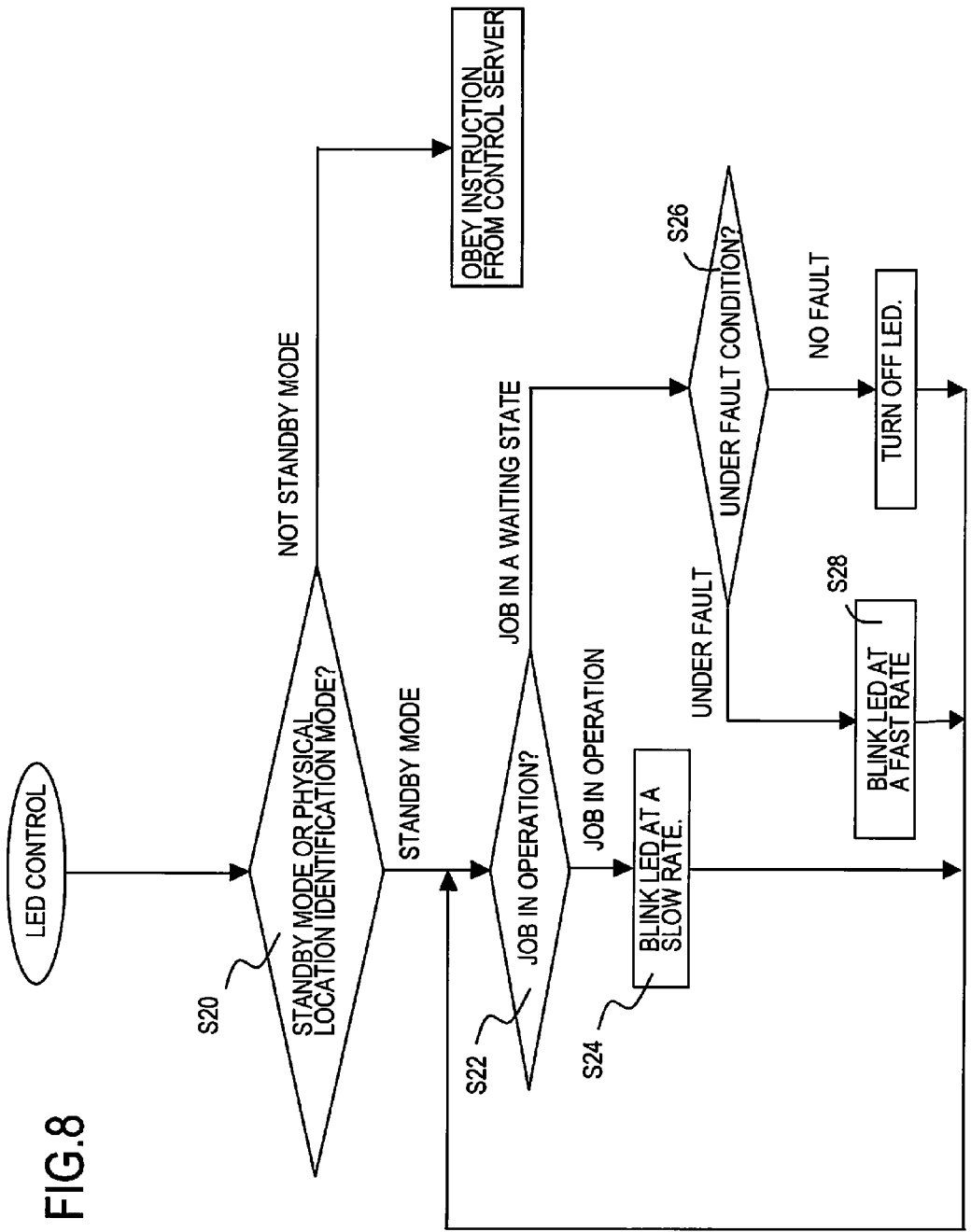
FIG. 8 is a processing flowchart of a standby mode shown in FIG. 6.

FIG. 6 is an explanation diagram of LED processing modes in the system control section 14. FIG. 7 is a processing flowchart of the self-diagnosis mode shown in FIG. 6. FIG. 8 is a processing flowchart of the standby mode.

As indicted in FIG. 6, the MPU 143 in the system control section 14 transfers a LED display processing status from among a self-diagnosis in-progress mode A at the time of performing self-diagnosis (FIG. 7), a standby mode B at the time of the server unit 1 being in operation (FIG. 8), and a physical location identification mode (FIG. 9 and thereafter) to identify an abnormal server unit.

Referring to FIG. 7, display processing during the self-diagnosis will be explained.

(S10) When the power is switched on, the MPU 143 blinks on the check lamps (LEDs) 2-1, 2-2.

(S12) When the MPU 143 receives a self-diagnosis start from each CPU block 10-13, the MPU 143 blinks the check lamps (LEDs) 2-1, 2-2.

(S14) The MPU 143 receives a self-diagnosis result from the CPU block 10-13 and, if the result represents an abnormality of the diagnosis, the MPU 143 turns on the check lamps (LEDs) 2-1, 2-2.

(S16) On the other hand, if the diagnosis result is not abnormal (i.e. normal), the MPU 143 turns off the check lamps (LEDs) 2-1, 2-2.

(S18) Then, the MPU 143 recognizes the completion of activation, and the MPU 143 is shifted to an idle state.

As such, the check lamps 2-1, 2-2 display the self-diagnosis status and the self-diagnosis result of the server unit 1.

Next, referring to FIG. 8, display processing during the standby mode will be explained.

(S20) The MPU 143 judges whether a physical location identification command has been received from the control LAN 9. On receipt of the physical location identification command from the control LAN 9, the MPU 143 transfers the status from the standby mode to the physical location identification mode (FIG. 9), and obeys commands from the control server unit. Additionally, on receipt of a release command from the LAN 9, the MPU 143 transfers the status from the physical location identification mode to the standby mode.

(S22) Under the standby mode, the MPU 143 receives a status notification of either one of job-in-operation and in-wait from the software of the CPU block 10-13, and judges whether presently the job is in operation.

(S24) In case of the job-in-operation status, the MPU 143 turns the check lamps (LEDs) 2-1, 2-2 on and off at a slow rate (i.e. in a long period), and returns to step S22.

(S26) In case of the job-in-a waiting state, the MPU 143 judges whether or not the CPU blocks 10-13 has sent a fault notification. If the notification has not been sent, the MPU 143 turns off the check lamps (LEDs) 2-1, 2-2, and returns to step S22.

(S28) When the fault is notified from the CPU block 10-13, the MPU 143 blinks the check lamps (LEDs) 2-1, 2-2 at a fast rate (i.e. in a short period), and returns to step S22.

As such, the check lamps (LEDs) 2-1, 2-2 display the job execution status of the server unit 1, as well as whether or not the server unit 1 is faulty.

[Physical Location Identification Processing of Abnormal Electronic Apparatus]

Figure 9:
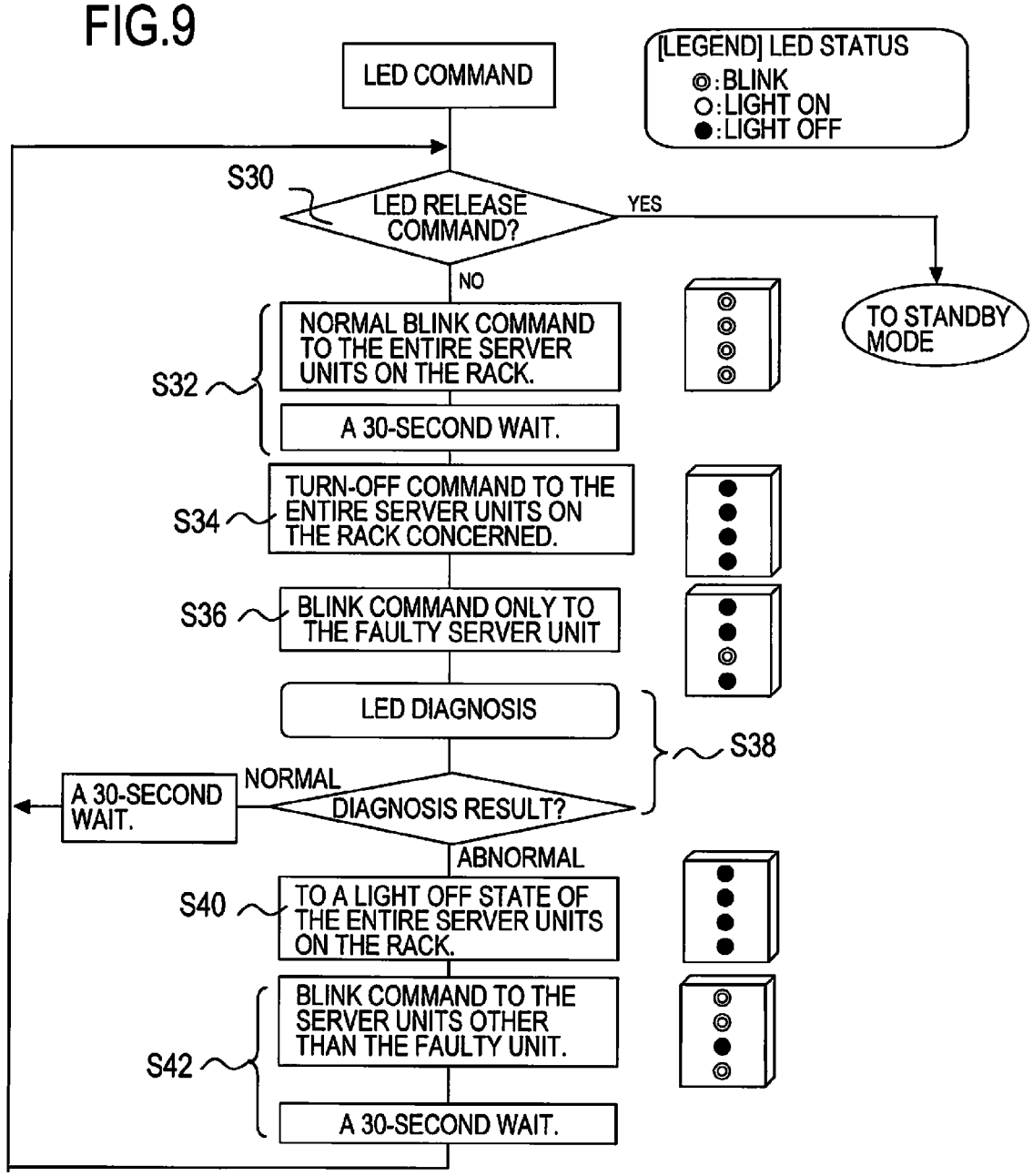
FIG. 9 is a flowchart of physical location identification processing shown in FIG. 6.
Figures 11, 12:
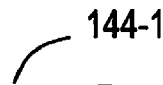
FIG. 11 is an explanation diagram of IP addresses of a server unit shown in FIG. 10.
FIG. 12 is an explanation diagram of a broadcast command using the IP addresses shown in FIG. 11.

FIG. 9 is a flowchart of physical location identification processing according to one embodiment of the present invention. FIG. 10 is an explanation diagram of a processing sequence. FIG. 11 is an explanation diagram of a configuration definition table in the system control section described in FIG. 5. FIG. 12 is an explanation diagram of a broadcast command to identify the physical location.

First, an IP address of the server unit on the control LAN 9 will be described. As indicated in FIG. 11, a subnet address is assigned on the rack-by-rack basis to the IP (Internet Protocol) address of the server unit 1 mounted on each rack. In the following, the description will be given to an exemplary case of 128 server units 1 being mounted on 16 racks, each having 8 shelf levels. When, to each server unit number 1-128, a rack number 1-16 and a mounted shelf-level number 1-8 are assigned, the level number is set in the lowest digit of the IP address, and the rack number is set in the second and the third digits from the lowest.

For example, when the server unit 1 having a unit number 1 is mounted on the first level of the rack having a rack number 1, the IP address is set to "192.168.11.1". Here, the lowest digit "1" indicates the shelf-level number, and the second and the third digits from the lowest digit, namely "11", indicate the rack number. Similarly, when the server unit 1 having the unit number 8 is mounted on the eighth level of the rack number 1, the IP address is set to "192.168.11.8".

By setting as such, it is possible to use a broadcast command as a location identification command. As indicated in FIG. 12, when the IP address to be added to a command (here, "setlocator blink" command to blink LEDs) is set to "192.168.11.255", from the relationship indicated in FIG. 11, a command to blink the LEDs of the entire 8 units mounted on the rack having the rack number 1 is signified.

When the IP address is set to "192.168.12.255", a command to blink the entire LEDs of the 8 units mounted on the rack having the rack number 2 is signified from the relationship indicated in FIG. 11. Namely, the value in the lowest digit is set to the maximum value "255", and in the upper digit thereof, the rack number is set.

With this, when changing the LED display mode of the entire server units 1 on a rack, it is possible to use a broadcast command, which makes it easy to instruct from the control server to each server unit 1. By backing up the IP address in each server unit 1, even in case server unit 1 is replaced, it is possible to restore without resetting the IP address accompanying the replacement. Further, the control server 1-1 has a function of shifting the LED display mode of the entire server units 1 on a rack, from the IP address of server unit 1 having output a fault notification.

Next, the physical location identification processing using the broadcast command will be described. FIG. 9 is the physical location identification processing in the server unit 1, when a fault is detected through self-diagnosis processing after switching on the unit power shown in FIG. 7. Referring to FIG. 10, the processing indicated in FIG. 9 will be explained.

(S30) The server unit 1 judges whether or not the command from the control server 1-1 is an LED release command. When the server unit 1 judges that the command is the LED release command, the server unit 1 shifts to the standby mode, as described earlier in FIG. 6.

(S32) As indicated in FIG. 11, when a certain server unit 1 detects a fault, the system control section 14 in the server unit 1 notifies the control server 1-1 of the fault through the control LAN 9. Using the aforementioned broadcast command, the control server 1-1 instructs to blink the LEDs of the entire server units 1 on the rack concerned. With this, the LEDs (check lamps) 2-1, 2-2 disposed in front and in back of the entire server units 1 on the rack concerned (for example, the rack having a rack number 1) are made to blink. Then, a 30-second wait is made. Namely, the blinks are repeated for 30 seconds. With this, among a plurality of racks, it is possible to physically recognize the rack on which the faulty server unit is mounted.

(S34) The control server 1-1 instructs to turn off LEDs 2-1, 2-2 on the entire server units 1 of the rack. With this, LEDs (check lamps) 2-1, 2-2 disposed in front and in back of the entire server units 1 on the rack of interest (for example, the rack having the rack number 1) are turned off.

(S36) Using an ordinary IP address (individual IP address indicated in FIG. 11) command, the control server 1-1 instructs to blink LEDs 2-1, 2-2 of the faulty server unit 1 only. By this, the LEDs (check lamps) 2-1, 2-2 of the faulty server unit 1 come to blink, so long as a fault does not exist. In case that the faulty server unit 1 accepts a command, or in case that LEDs 2-1, 2-2 and the control circuit are not faulty, the LEDs of interest come to blink. Therefore, in case that the faulty server unit 1 can accept the command, and that both the LED 2-1, 2-2 nor the control circuit is not faulty, it is possible to identify the physical location of the faulty server unit 1 on the rack of interest.

(S38) The faulty server unit 1 performs self-diagnosis of the LEDs 2-1, 2-2 (including the control circuit thereof). Then, the faulty server unit 1 notifies the control server 1-1 of the self-diagnosis result. When the control server 1-1 decides that the self-diagnosis result is normal, the server unit 1 returns to step S30, because the physical location of the faulty server unit 1 could be identified.

(S40) On the other hand, when the self-diagnosis result of the server unit 1 is abnormal, there is a fault in the LED 2-1, 2-2, and as a result, the LED 2-1, 2-2 concerned does not blink in step S36. Therefore, it is not possible to identify the physical location of the faulty server unit 1 in step S36. Accordingly, the control server 1-1 instructs to turn off the LEDs 2-1, 2-2 of the entire server units 1 on the rack of interest by using abovementioned broadcast command. With this, the LEDs (check lamps) 2-1, 2-2 disposed in front and in back of the entire server units 1 of the rack of interest (for example, the rack having the rack number 1) are turned off.

(S42) Using an ordinary IP address (individual IP address indicated in FIG. 11) command, the control server 1-1 instructs to blink the LEDs 2-1, 2-2 of the server units 1 other than the faulty server unit 1. With this, the LEDs (check lamps) 2-1, 2-2 of the server units 1 other than the faulty server unit 1 come to blink. In contrast, the LEDs 2-1, 2-2 of the faulty server unit 1 are kept in the light-off state. Then, a 30-second wait is made. Namely, blinks are repeated for 30 seconds. With this, among a plurality of racks, it is possible to physically recognize the rack on which the faulty server unit is mounted. Then the process returns to step S30.

As such, the LEDs of the entire server units of the rack on which the faulty server unit is mounted are blinked, so that the rack location is identified. Then, the LEDs of the faulty server unit are blinked, and thus, the physical location of the faulty server unit at the rack location is identified. As a result, it is easily possible to identify the physical location of the faulty server unit, even when a plurality of racks are installed.

When the LEDs of the faulty server unit do not work, the LEDs of the entire server units on which the faulty server unit is mounted are turned off. Next, the LEDs of the server units other than the faulty server unit are blinked. Thus, the physical location of the faulty server unit at the rack location is identified.

Further, by setting a subnet to the IP address of a server unit, and light-off and blink commands are issued using a broadcast command. With this, command processing to identify the physical location becomes easy.

[Substitutive Processing for the Physical Location Identification Processing]

Next, in the above-mentioned embodiment, physical location identification processing is executed based on the command from the control server 1-1 when any one of server units 1 becomes faulty. However, there is possibility that the control server 1-1 becomes faulty. In an embodiment discussed herein, when the control server 1-1 becomes faulty, another server unit 1 performs substitutive processing to identify the physical location.

Figure 13:
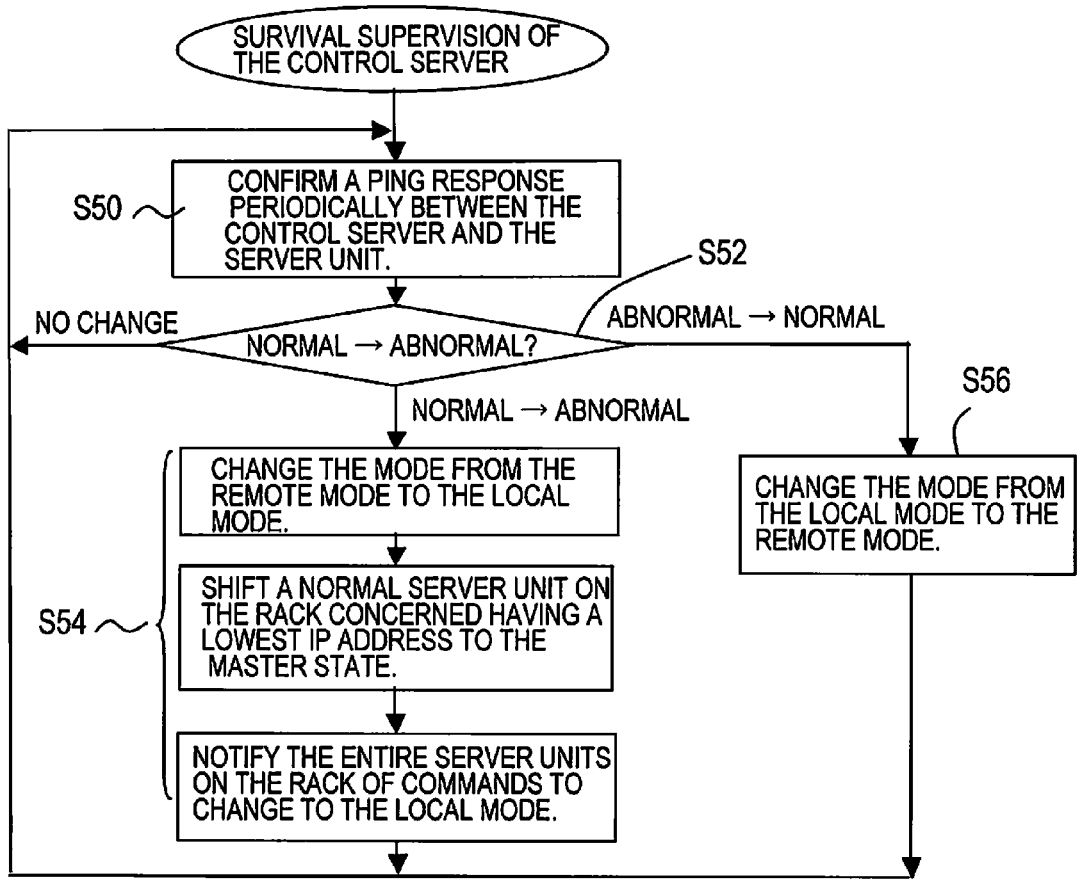
FIG. 13 is a flowchart of substitutive processing to identify the physical location of the server unit according to one embodiment of the present invention.
Figure 14:
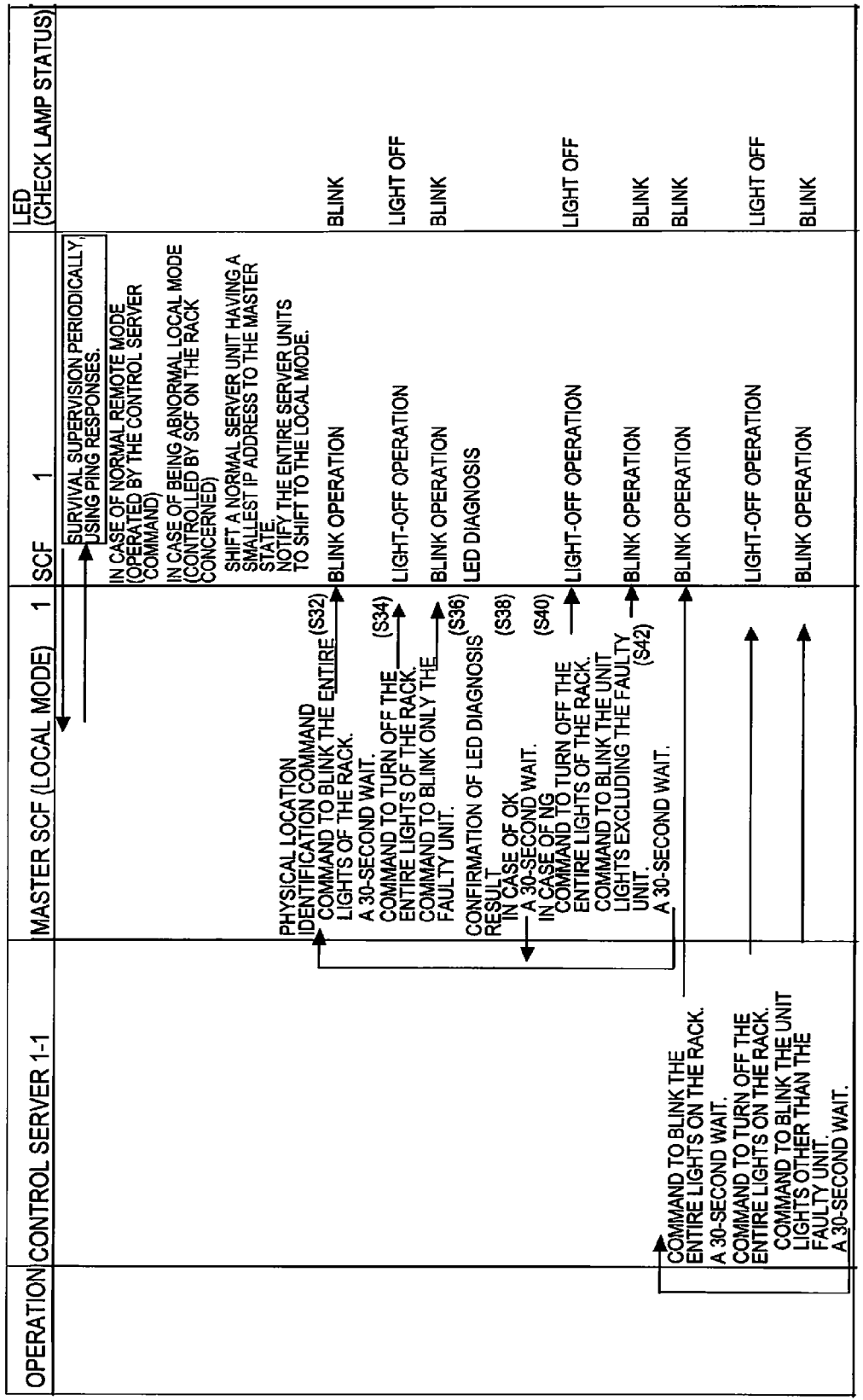
FIG. 14 is an explanation diagram of a processing sequence shown in FIG. 13.
Figure 15:
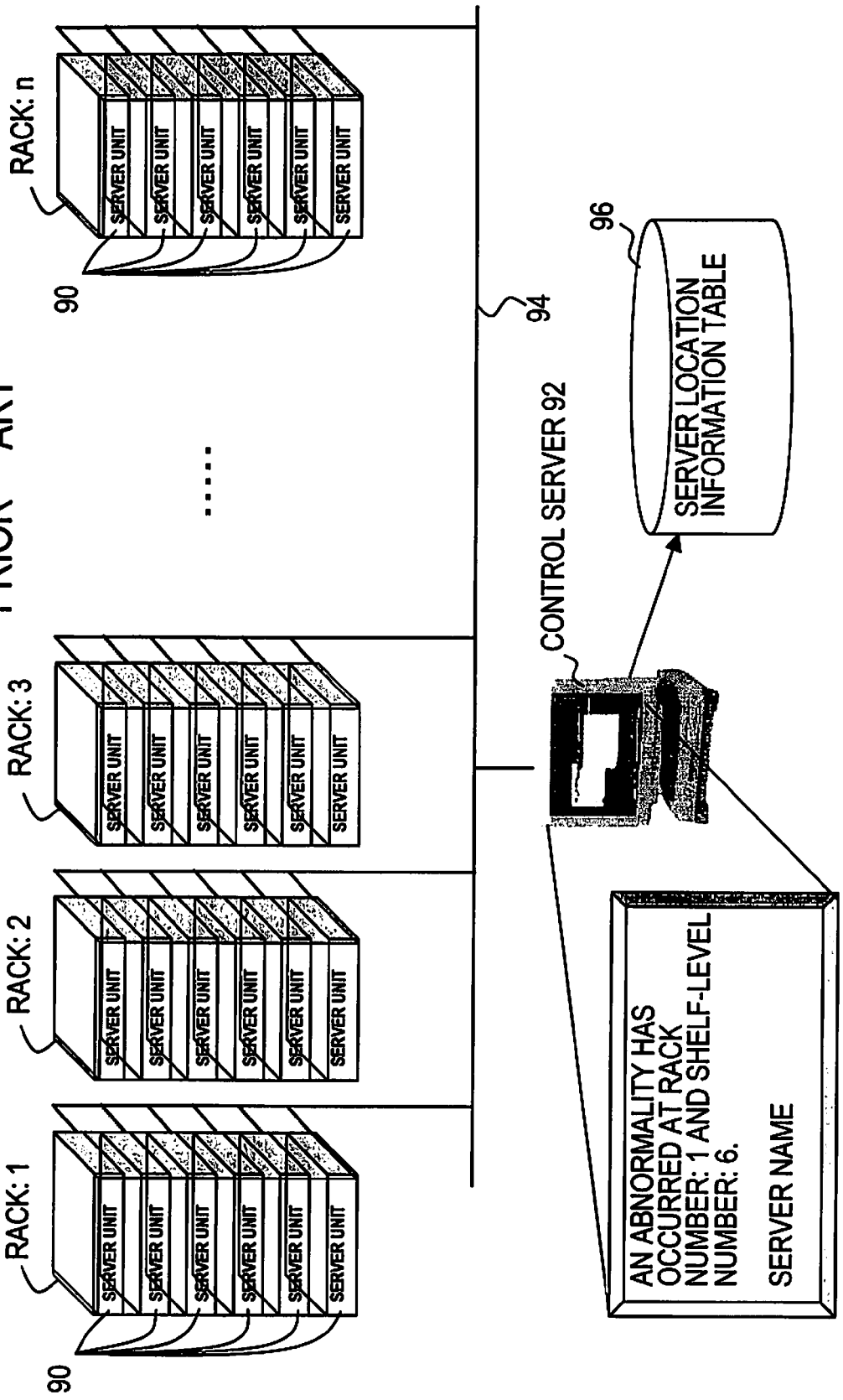
FIG. 15 is an explanation diagram of the conventional method for identifying the physical location of the rack-mounted electronic apparatus.

FIG. 13 is a flowchart of the substitutive processing to identify the physical location of the server unit according to one embodiment of the present invention. FIG. 14 is an explanation diagram of a processing sequence indicated in FIG. 13.

(S50) The control server 1-1 and each server unit 1 periodically confirm PING response to confirm each being active or disabled, and detects whether normality or abnormality of the control server 1-1 and server unit 1.

(S52) By confirming a PING response, the server unit 1 decides whether or not the status changes from being normal to abnormal, or from being abnormal to normal. On deciding the status has not changed, the server unit 1 returns to step S50.

(S54) On deciding that the status of the control server 1-1 has changed from being normal to abnormal, the server 1 shifts the mode from a remote mode (remote operation mode from the control server 1-1) to a local mode. Then, the server unit 1, which is in a normal state within the rack among the plurality of server units 1 and has the smallest IP address value, changes a mode to a master state. Further, server unit 1 in the master state instructs other server units 1 on the rack concerned to shift to the local mode.

Thereafter, as indicated in FIG. 14, the master server unit executes the physical location identification processing S30-S42 shown in FIG. 9, which has been executed by the control server 1-1.

(S56) Oppositely, when the control server decides that the status has changed from being abnormal to normal, the control server 1-1 shifts the mode from the local mode to the remote mode. Thereafter, the control server 1-1 executes the physical location identification processing S30-S42 shown in FIG. 9.

As such, even when the control server 1-1 becomes abnormal, any other server unit 1 can perform physical location identification processing in a substitutive manner.

OTHER EMBODIMENTS

In the aforementioned embodiments, the description has been given using the server unit as electronic apparatus. However, the present invention is also applicable to a storage unit such as a magnetic disk unit and a communication unit. Further, the blink display in the physical location identification processing may be modified to light-on display.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An electronic apparatus system comprising:
a plurality of racks that each mounts a plurality of electronic apparatuses;
a light emitting device provided on each of the plurality of electronic apparatuses and that displays a status of the electronic apparatus;
a network connecting each of the plurality of electronic apparatuses to a control electronic apparatus; and
the control electronic apparatus that receives an abnormality notification from one of the plurality of electronic apparatuses that detected an abnormality through the network and executes an identification processing of an installation location of the one electronic apparatus,
wherein, upon the reception of the abnormality notification, the control electronic apparatus sequentially issues a first light emission command including a rack number of a rack mounting the one electronic apparatus to the network to control the light emitting devices of the plurality of electronic apparatuses on the rack mounting the one electronic apparatus to be in a substantial identical display mode, and then issues a second light emission command including an address of the one electronic apparatus to the network to control only the light emitting device of the one electronic apparatus to be a display mode to distinguish the one electronic apparatus from other electronic apparatuses mounting on the same rack as the one electronic device.

2. The electronic apparatus system according to claim 1, wherein the control electronic apparatus controls to turn on the light emitting devices of the other electronic apparatuses, when the control electronic apparatus receives a notification that the light emitting device of the one electronic apparatus is faulty from the one electronic apparatus through the network after issuing the second light emission command.

3. The electronic apparatus system according to claim 1, wherein the control electronic apparatus communicates with each of the plurality of electronic apparatuses through the network to confirm a normality or abnormality of the control electronic apparatus, and when the control electronic apparatus is abnormal, one of the plurality of electronic apparatuses operating normally performs display control of the light emitting devices of the plurality of electronic apparatuses at the identification of the one electronic apparatus on behalf of the control electronic apparatus.

4. The electronic apparatus system according to claim 1, wherein the light emitting devices are disposed on a front face and a back face of the electronic apparatus.

5. The electronic apparatus system according to claim 1, wherein the identical display mode of the light emitting devices of the electronic apparatuses on the rack mounting the one electronic apparatus is blinks of the light emitting devices.

6. The electronic apparatus system according to claim 1, wherein the electronic apparatus changes rhythm of blinks of the light emitting devices according to an operation condition of the electronic apparatus.

7. The electronic apparatus system according to claim 1, wherein the electronic apparatus is constituted of a server unit.

8. A processing method of identifying a physical location of an electronic apparatus, the processing method comprising:
receiving an abnormality notification from one electronic apparatus that detected an abnormality through a network connecting a plurality of electronic apparatuses mounted on a plurality of racks to a control electronic apparatus by the control electronic apparatus;
issuing, by the control electronic apparatus, a first light emission command including a rack number of a rack mounting the one electronic apparatus to the network to control light emitting devices of the plurality of electronic apparatuses on the rack mounting the one electronic apparatus to be in an identical display mode in response to the abnormal notification; and issuing, by the control electronic apparatus, a second light emission command, after issuing the first light emission command, including an address of the one electronic apparatus to the network to control the light emitting device of the one electronic apparatus to be a display mode to distinguish the one electronic apparatus from other electronic apparatuses mounting on the same rack as the one electronic device.

9. The processing method of identifying the physical location of the electronic apparatus according to claim 8, further comprising:

controlling to turn on the light emitting devices of the other electronic apparatuses when the control electronic apparatus receives a notification that the light emitting device of the one electronic apparatus is faulty from the one electronic apparatus through the network after issuing the second light emission command.

10. The processing method of identifying the physical location of the electronic apparatus according to claim 8, further comprising:

communicating between each the electronic apparatuses through the network to confirm a normality or abnormality of the control electronic apparatus; and substitutive performing said display control of the light emitting devices of the electronic apparatuses originally performed by the control electronic apparatus, by one of the plurality electronic apparatuses operating normally when said control electronic apparatus is abnormal.

11. The processing method of identifying the physical location of the electronic apparatus according to claim 8, further comprising:

controlling to display the light emitting devices disposed on a front face and a back face of the electronic apparatus.

12. The processing method of identifying the physical location of the electronic apparatus according to claim 8, wherein said controlling of the identical display mode comprises blinking the light emitting devices of the electronic apparatuses.

13. The processing method of identifying the physical location of the electronic apparatus according to claim 8, further comprising:

changing rhythm of blinks of the light emitting devices in accordance with an operation condition of the electronic apparatus.

14. The processing method of identifying the physical location of the electronic apparatus according to claim 8, wherein the electronic apparatus is constituted of a server unit.

* * * * *